(12) United States Patent
de Chavez

(10) Patent No.: US 11,444,649 B1
(45) Date of Patent: Sep. 13, 2022

(54) ROTATING SIDE SLIDING HANDLE APPARATUS FOR MOBILE PHONE

(71) Applicant: Avelino V. de Chavez, Forest Hills, NY (US)

(72) Inventor: Avelino V. de Chavez, Forest Hills, NY (US)

( * ) Notice: Subject to any disclaimer, the term of this patent is extended or adjusted under 35 U.S.C. 154(b) by 363 days.

(21) Appl. No.: 16/875,731

(22) Filed: May 15, 2020

(51) Int. Cl.
*H04B 1/3888* (2015.01)
*F16M 13/06* (2006.01)
*F16M 13/04* (2006.01)

(52) U.S. Cl.
CPC ........... *H04B 1/3888* (2013.01); *F16M 13/04* (2013.01); *F16M 13/06* (2013.01)

(58) Field of Classification Search
CPC ........ A45F 2005/008; A45F 2200/0516; A45F 5/00; F16M 13/04; F16M 13/00; F16M 13/02; F16M 11/2021; F16M 11/10; F16M 11/105; H04M 1/04; H04M 1/3888
See application file for complete search history.

(56) References Cited

U.S. PATENT DOCUMENTS

| | | | | |
|---|---|---|---|---|
| 8,382,059 B2 * | 2/2013 | Le Gette | ............... | F16M 11/105 248/463 |
| 8,520,371 B2 * | 8/2013 | Peng | ..................... | F16M 13/005 248/920 |
| 9,179,565 B2 | 11/2015 | Cho | | |
| 9,267,642 B2 | 2/2016 | Enkerlin et al. | | |
| 9,392,865 B2 | 7/2016 | Shmulevich | | |
| D765,662 S | 9/2016 | Kang | | |
| 9,800,283 B2 | 10/2017 | Schmidt | | |
| D808,787 S | 1/2018 | Kinskey | | |
| 9,930,943 B2 | 4/2018 | Lach et al. | | |
| 9,942,369 B2 | 4/2018 | Sadai | | |
| 10,003,681 B1 | 6/2018 | Hsu | | |
| 10,113,691 B2 * | 10/2018 | Grieve | .................. | G06F 1/1626 |
| 10,352,498 B2 | 7/2019 | Rieger | | |
| 10,533,700 B1 * | 1/2020 | Mulhall | ............... | F16M 13/005 |
| 11,369,189 B2 * | 6/2022 | Carnevali | .................. | A45F 5/10 |
| 2012/0025039 A1 * | 2/2012 | Segal | ...................... | F16M 11/38 248/188.6 |
| 2012/0275094 A1 * | 11/2012 | Zhou | ...................... | F16M 11/10 361/679.01 |
| 2014/0124521 A1 | 5/2014 | Brown | | |

* cited by examiner

*Primary Examiner* — Corey N Skurdal
(74) *Attorney, Agent, or Firm* — Goldstein Law Offices, P.C.

(57) ABSTRACT

A rotating side sliding handle apparatus is disclosed. The apparatus includes a base having an adhesive that is removably attachable to an electronic device, a rotating plate pivotally connected to the base, a slide member slidably disposed on the rotating plate, and a grab bar slidably disposed within the slide member. The rotating plate includes an arm and a lever for releasably engaging the rotating plate with the base into a locked configuration and an unlocked configuration. The rotating plate is rotatable about the base in the unlocked configuration. The slide member is retractably extendable from the rotating plate in a horizontal direction to slide orthogonally outwardly relative to an axis of the rotating plate. The grab bar is retractably extendable from the slide member in a horizontal direction to slide orthogonally outwardly relative to an axis of the rotating plate and past a side edge of the electronic device.

16 Claims, 11 Drawing Sheets

ROTATING SIDE SLIDING HANDLE APPARATUS FOR MOBILE PHONE

TECHNICAL FIELD

The present disclosure relates generally to retrofit mobile phone handles. More particularly, the present disclosure relates to a handle apparatus attachable to a mobile phone that enables a user to stably hold the mobile phone from a side of the mobile phone and rotate a grab bar relative to the mobile phone to adjust the position of the grab bar to hold the mobile phone in different orientations.

BACKGROUND

The increase in size of mobile phones has made it progressively harder to stably hold a mobile phone while interacting with the graphic user interface (GUI) of the mobile phone. As such, retrofit mobile phone handles to aid in the stable holding of mobile phones are available. However, conventional mobile phone handles are not capable of jutting out from a side of the mobile phone, which causes significant drawbacks. For instance, U.S. Pat. No. 9,179,565 discloses a mobile phone handle including a ring and a base that attaches to the back of the mobile phone. The ring is connected to the base and can rotate about the base while also pivoting up and down. However, the ring cannot extend past the edges of the mobile phone to jut out from a side, and rather is circumscribed by the edges. Indeed, the majority of mobile phone handles pivot and/or rotate relative to the mobile phone when attached thereto but are not capable of sliding and/or extending past the edges and/or sides of the mobile phone. This is disadvantageous because users having smaller hands or fingers, or having a relatively larger mobile phone must position their hand or hands more towards the center of the back of the mobile phone and further away from the screen in order to properly grasp the handle. This distances their thumb or input finger from the display screen of the mobile phone making it more difficult to fully reach across the display screen to interact with the GUI of the mobile phone.

Accordingly, there is a need for a retrofit mobile phone handle that is configured to attach to a mobile phone and jut out the side of the mobile phone to help a user stably hold the mobile phone and more easily interact with the GUI of the mobile phone.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a mobile phone handle that includes a grab bar capable of sliding out from the side of a mobile phone. Accordingly, the present disclosure provides a side sliding handle apparatus attachable to the back of a mobile phone that includes a grab bar that slides horizontally laterally along the back of a mobile phone toward and past the side edges of a mobile phone.

An aspect of an example embodiment in the present disclosure is to provide a mobile phone handle that enables a user to hold the mobile phone in both landscape and portrait orientations. Accordingly, the present disclosure provides a rotating side sliding handle apparatus including a grab bar coupled to a rotating plate that rotates about the back of the mobile phone to adjustably position the grab bar in an orientation that enables a user to hold the mobile phone in a landscape or portrait orientation.

An aspect of an example embodiment in the present disclosure is to provide a mobile phone handle that can accommodate larger mobile phones or electronic devices such as tablets. Accordingly, the present disclosure provides a rotating side sliding handle apparatus including a grab bar disposed within a slide member that slides horizontally laterally along the back of a mobile phone to provide the grab bar extra reach if the area of the back of the mobile phone is larger.

An aspect of an example embodiment in the present disclosure is to provide a mobile phone handle that is capable of being secured in a stable position. Accordingly, the present disclosure provides a rotating side sliding handle apparatus including a base having lock holes and a rotating base have a locking flange for releasably engaging the lock holes.

An aspect of an example embodiment in the present disclosure is to provide a mobile phone handle including a stand for propping a mobile phone in an upright position for usage without hands. Accordingly, the present disclosure provides a stand pivotally connected to a rotating plate, wherein the stand pivots vertically outwardly so as to provide a protruding member that can be used to prop up the mobile phone.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 3:
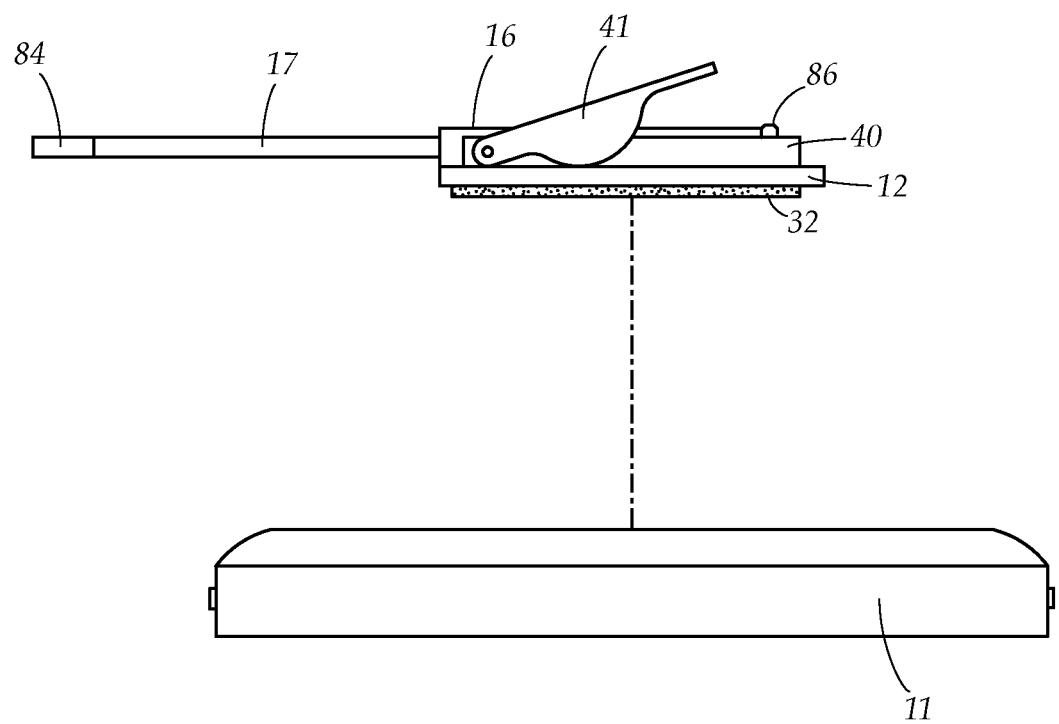
FIG. 3 is an exploded view of the rotating side sliding handle apparatus and a mobile phone, illustrating one manner in which the grab bar attaches to the back of a mobile phone according to one embodiment of the present disclosure.
Figure 4A:
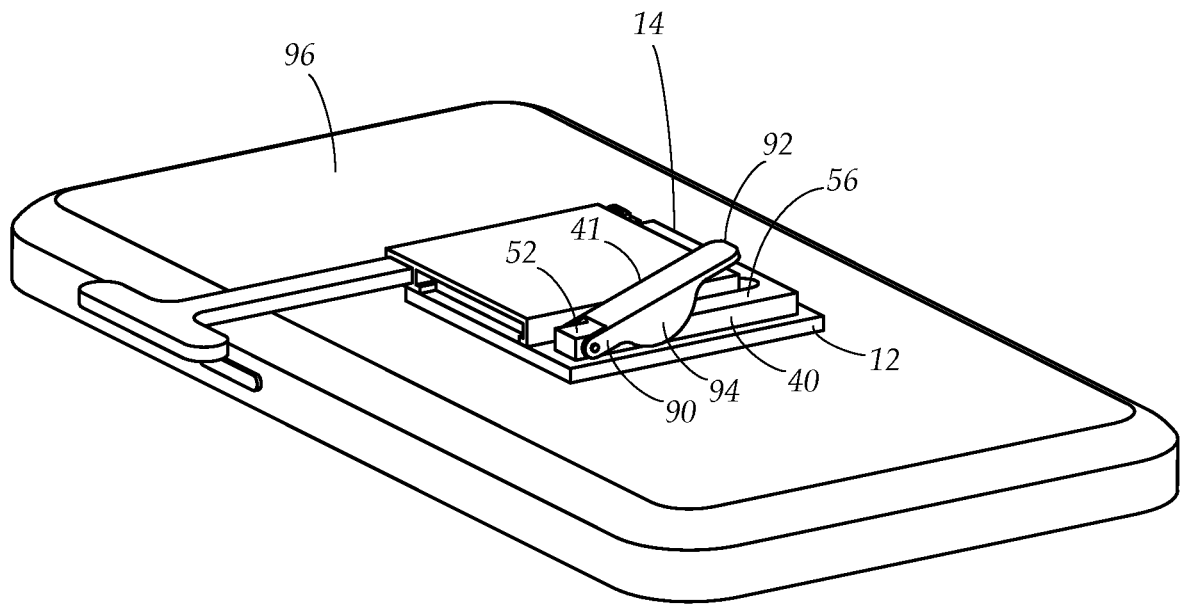
FIG. 4A is a perspective view of the rotating side sliding handle apparatus attached to the back of a mobile phone, illustrating the stand locked in the base to fix the rotating plate in a locked position and the grab bar slid out from the rotating base past the side edge of the mobile phone according to one embodiment of the present disclosure.
Figure 4B:
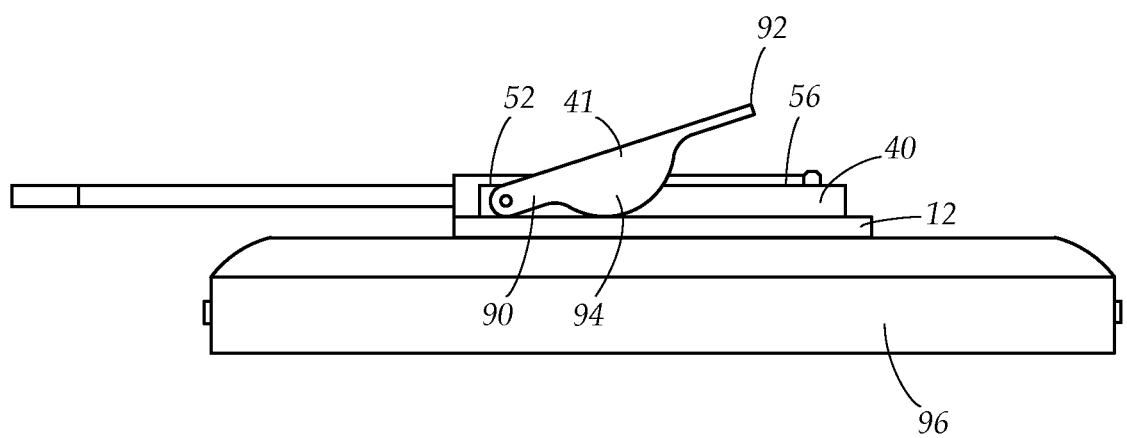
FIG. 4B is a side view of the rotating side sliding handle apparatus attached to the back of a mobile phone, illustrating the stand locked in the base to fix the rotating plate in a locked position and the grab bar slid out from the rotating base past the side edge of the mobile phone according to one embodiment of the present disclosure.
Figure 5A:
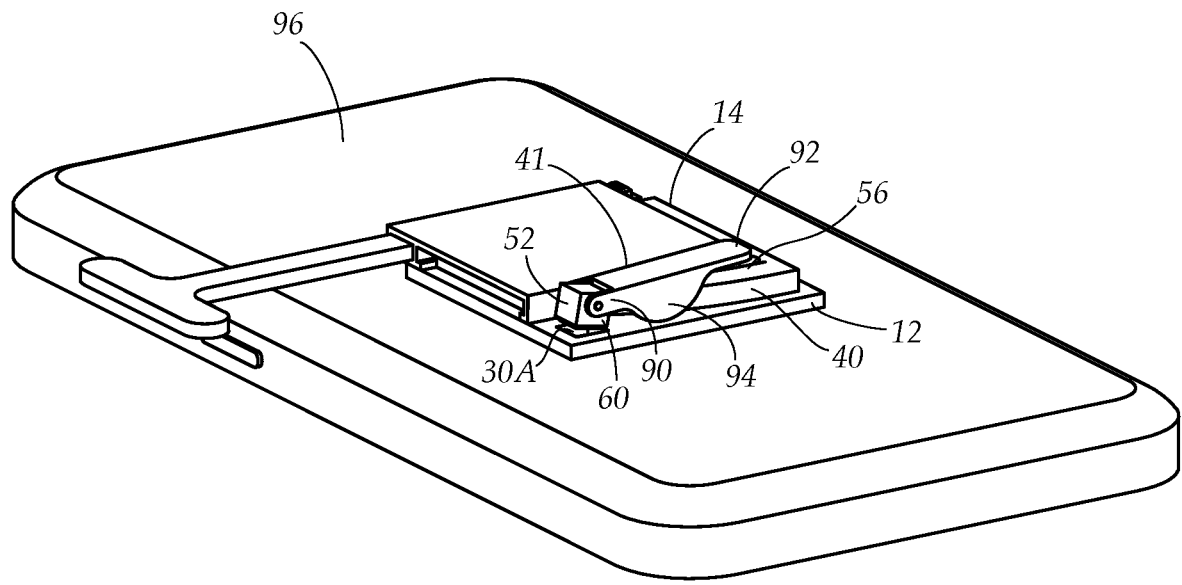
FIG. 5A is a perspective view of the rotating side sliding handle apparatus attached to the back of a mobile phone, illustrating the stand unlocked from the base to release the rotating plate from the base in an unlocked position and the grab bar slid out from the rotating base past the side edge of the mobile phone according to one embodiment of the present disclosure.
Figure 5B:
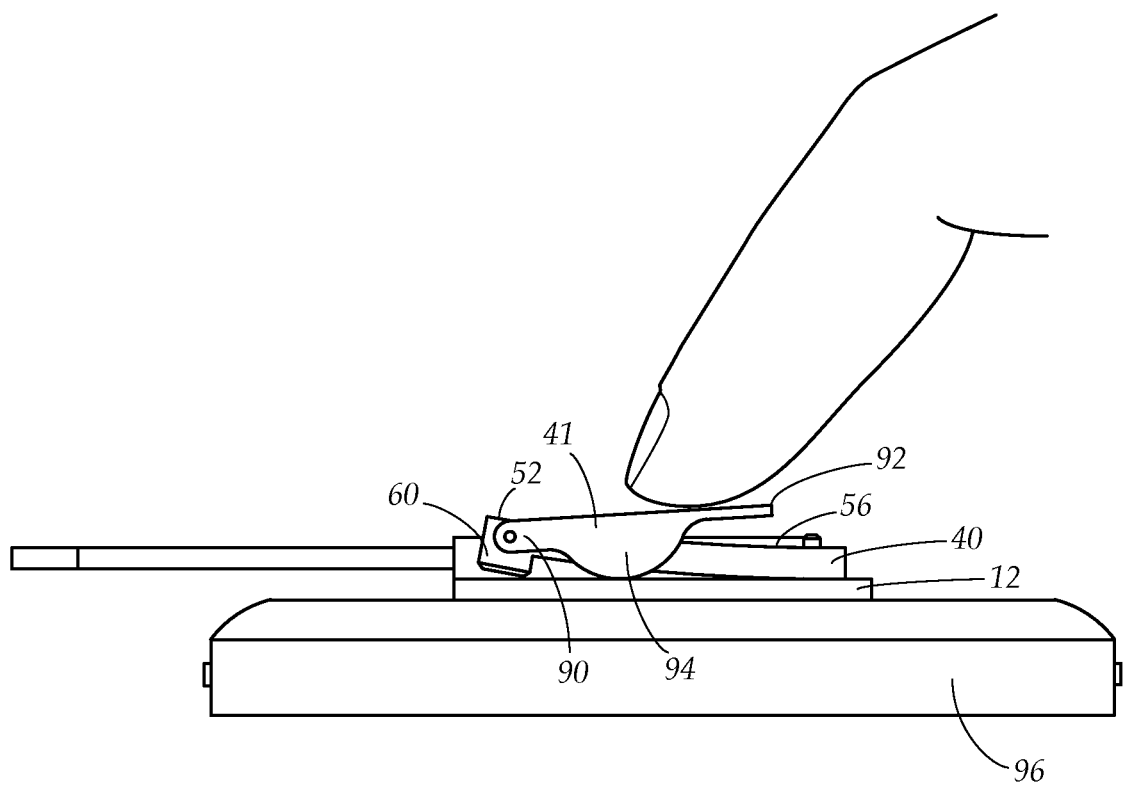
FIG. 5B is a side view of the rotating side sliding handle apparatus attached to the back of a mobile phone, illustrating the stand unlocked from the base to release the rotating plate from the base in an unlocked position and the grab bar slid out from the rotating base past the side edge of the mobile phone according to one embodiment of the present disclosure.
Figure 8:
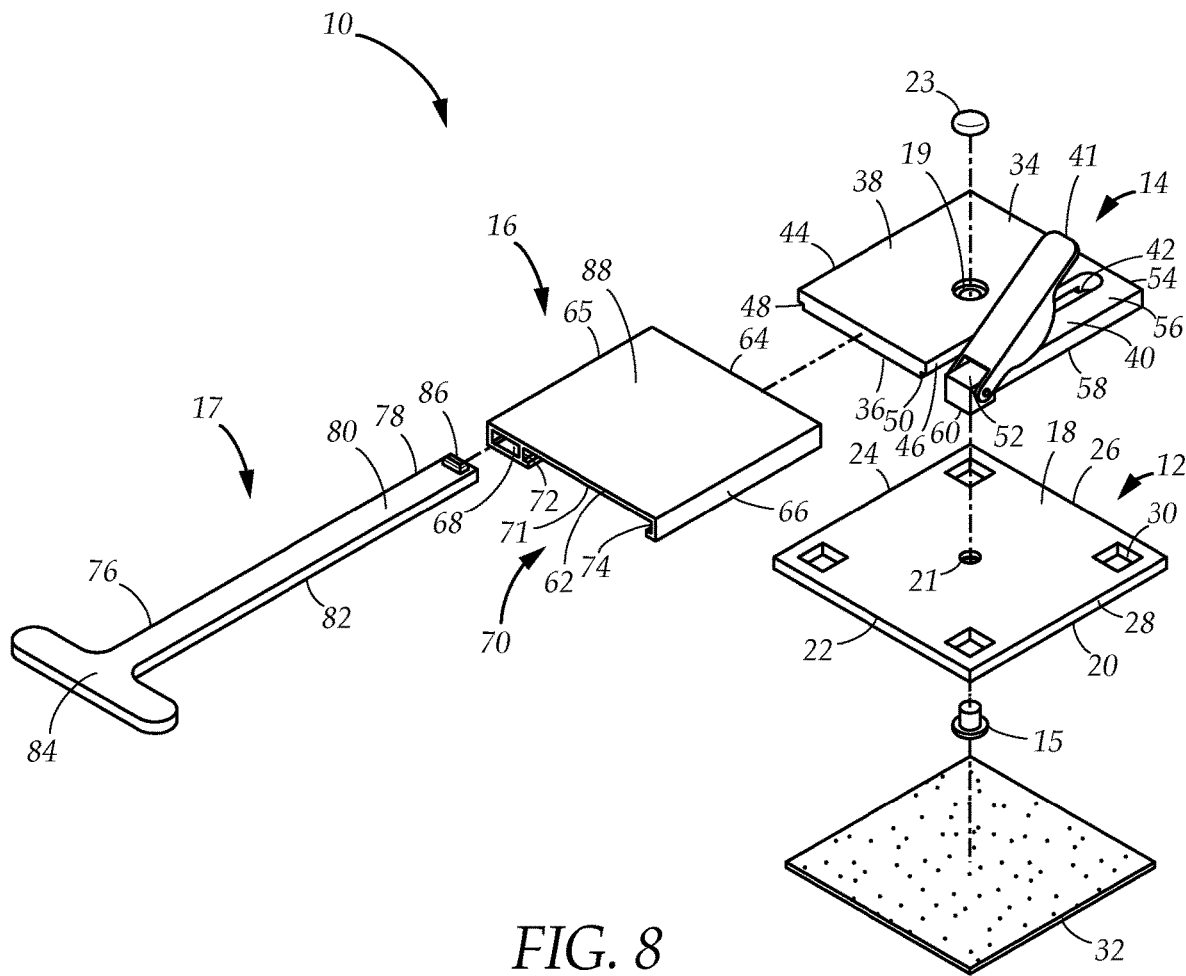
FIG. 8 is an exploded view of the rotating sliding handle apparatus, illustrating the components of the rotating sliding handle apparatus and one manner in which the components assemble to form the rotating sliding handle apparatus according to one embodiment of the present disclosure.
Figure 9:
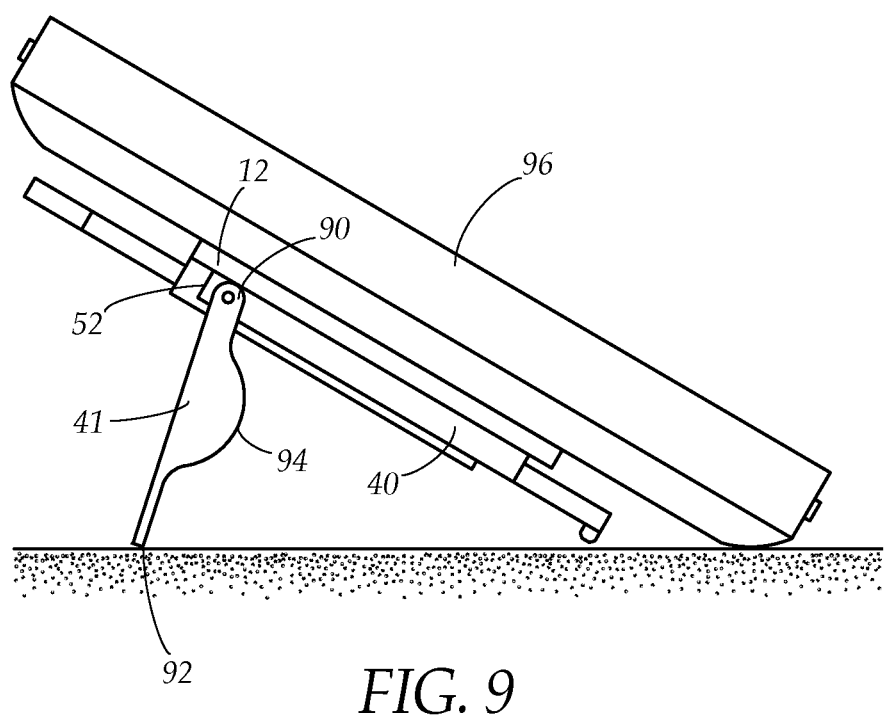
FIG. 9 is a side view of the rotating sliding handle apparatus attached to the back of a mobile phone, illustrating the stand pivoted outwardly from the rotating plate and in use as a stand to prop up the mobile phone for use without holding according to one embodiment of the present disclosure.

Referring to FIGS. 3 and 8, the present disclosure provides a rotating side sliding handle apparatus 10 for attachment to the back of a mobile phone 11. The rotating side sliding handle apparatus 10 comprises a base 12 attachable to a mobile phone, a rotating plate 14 coupled to the base 12, a slide member 16 coupled to the rotating plate 14, and a grab bar 17 coupled to the slide member 16.

In embodiments, the base 12 comprises a planar plate including an upper surface 18, a lower surface 20 opposite the upper surface 18, a first side 22, a second side 24, a third side 26 opposite the first side 22, a fourth side 28 opposite the second side 24, a plurality of lock holes 30 extending between the upper surface 18 and the lower surface 20, and an adhesive 32 for removably attaching the handle apparatus 10 to the back of an electronic device. The first side 22 extends parallel relative to the third side 26 the second side 24 extends parallel relative to the fourth side 28. The first side 22 and third side 26 are orthogonal relative to the second side 24 and the fourth side 28. The plurality of lock holes are disposed on each of the first side 22, the second side 24, the third side 26, and the fourth side 28. In embodiments, the adhesive 32 comprises a planar member attached to the lower surface 20 of the base 12 that is coextensive with the lower surface 20.

The rotating plate 14 is pivotally connected to the base 12 and configured to releasably engage the base 12 in a locked position and an unlocked position. In the locked position the rotating plate 14 is fixed to the base 12 in a static position and in the unlocked position the rotating plate 14 is free to rotate horizontally axially about the base 12. The rotating plate 14 comprises an upper surface 34, a lower surface 36 opposite the upper surface 34, a body 38, an arm 40 separated from the body 38 by a cutout portion 42, and a stand 41 coupled to the arm 40. The rotating plate 14 includes a central vertical axis extending through the rotating plate 14 orthogonally relative to upper surface 34 and lower surface 36 of the rotating plate 14. The rotating plate 14 is coaxial with the base 12. The body 38 and the arm 40 are coplanar relative to each other. The body 38 includes a first side 44 and a second side 46 opposite the first side 44. The first side 44 includes a first groove 48 and the second side 46 includes a second groove 50. In embodiments, the rotating plate 14 is pivotally connected to the base 12 via a pivot 15. In some embodiments, the pivot 15 comprises a pivot rivet. The rotating plate 14 includes a first aperture 19 and the base 12 includes a second aperture 21 that are coaxially aligned. The pivot 15 is threaded through the first aperture 19 and the second aperture 21 and fastened with a cap 23 to secure the rotating plate 14 and the base 12 to each other about the pivot 15.

The arm 40 includes a first end 52, a second end 54 opposite the first end 52, an upper surface 56, and a lower surface 58 opposite the upper surface 56. The first end 52 includes a flange 60 protruding downwardly outwardly from the lower surface 58 toward the base 12 and away from the rotating plate 14. The flange 60 is releasably engageable with the plurality of lock holes 30 of the base 12. The flange 60 engages each of the plurality of lock holes 30 to secure the rotating plate 14 in the locked position and disengages the plurality of lock holes 30 to release the rotating plate 14 in the unlocked position. The cutout portion 42 defines a space between the body 38 and the arm 40.

The slide member 16 is slidably disposed on the rotating plate 14. The slide member 16 comprises a first end 62, a second end 64 opposite the first end 62, a first side 65, a second side 66 opposite the first side 65, a channel 68 extending between the first end 62 and the second end 64, and a track 70 extending between the first end 62 and the second end 64. The channel 68 defines an interior cavity through which the grab bar 17 is positioned. The track 70 is configured to slidably receive the body 38 of rotating plate 14. The track 70 includes a first rail 72, a second rail 74 opposite and parallel to the first rail 72, and an opening 71 between the first rail 72 and the second rail 74. The first rail 72 slidably engages the first groove 48 and the second rail 74 slidably engages the second groove 50. The opening 71 of the track 70 receives the body 38 of the rotating plate 14 while the cutout portion 42 receives the second side 66 of the slide member 16, thereby enabling the slide member 16 to slide over the rotating plate 14.

The grab bar 17 includes a first end 76, a second end 78 opposite the first end 76, a first surface 80, and a second surface 82 opposite the first surface 80. The first end 76 includes a finger grip 84 comprising a t-shaped member that is coplanar with the grab bar 17. The t-shaped member protrudes outwardly from the first end 76 and includes a width larger than a width of the channel 68 of the slide member 16 to prevent the finger grip 84 from entering the channel 68, thereby securing the grab bar 17 within the channel 68. The second end 78 of the grab bar 17 comprises a projection 86 protruding upwardly from the first surface 80. In embodiments, the projection 86 extends past the upper surface 88 of the slide member 16. In some embodiments, the projection 86 is flush with the upper surface 88 of the slide member 16. The projection 86 prevents the second end 78 of the grab bar 17 from entering the channel 68, thereby securing the grab bar 17 within the channel 68.

Referring now to FIGS. 4A-5B and 9, the stand 41 is configured to release the flange 60 from a lock hole 30A of the plurality of lock holes 30 (see FIG. 8) to release the rotating plate 14 in an unlocked position. The stand 41 is pivotally connected to the first end 52 of the arm 40 on the upper surface 56 of the arm 40 such that the arm 40 is positioned between the stand 41 and the base 12. The stand 41 is vertically pivotable relative to the rotating plate 14 such that is may pivot up and down toward and away from the arm 40 and base 12. When pivoted fully upward, or to an open position, the stand 41 protrudes substantially orthogonally outwardly relative to the back of the mobile phone 96 such that the stand 41 may be utilized to prop up the mobile phone for usage without hands.

The stand 41 includes a first end 90, a second end 92 opposite the first end 90, and an arcuate portion 94 extending between the first end 90 and the second end 92. The first end 90 of the stand 41 is pivotally connected to the first end 52 of the arm 40. The arcuate portion 94 extends downwardly toward the base 12 and includes a height larger than a height of the first end 90 of the stand 41, a height of the second end 92 of the stand 41, and a height of the arm 40. In a resting closed position, the arcuate portion 94 abuts the base 12 causing the second end 92 of the stand 41 to jut out from the arm 40 and protrude outwardly relative to a mobile phone 96.

The stand 41 defines a lever including a fulcrum, an effort arm, and a resistance arm that releasably engages and disengages the flange 60 to/from the plurality of lock holes 30. The arcuate portion 94 is the fulcrum, the second end 92 is the effort arm, and the first end 90 is the resistance arm. Indeed, a downward force exerted on the second end 92 exerts an upward force on the first end 90 over the arcuate portion 94, which in turn exerts an upward force on the first end 52 of the arm 40 to disengage the flange 60 from the lock hole 30A and release the rotating plate 14.

Figure 6A:
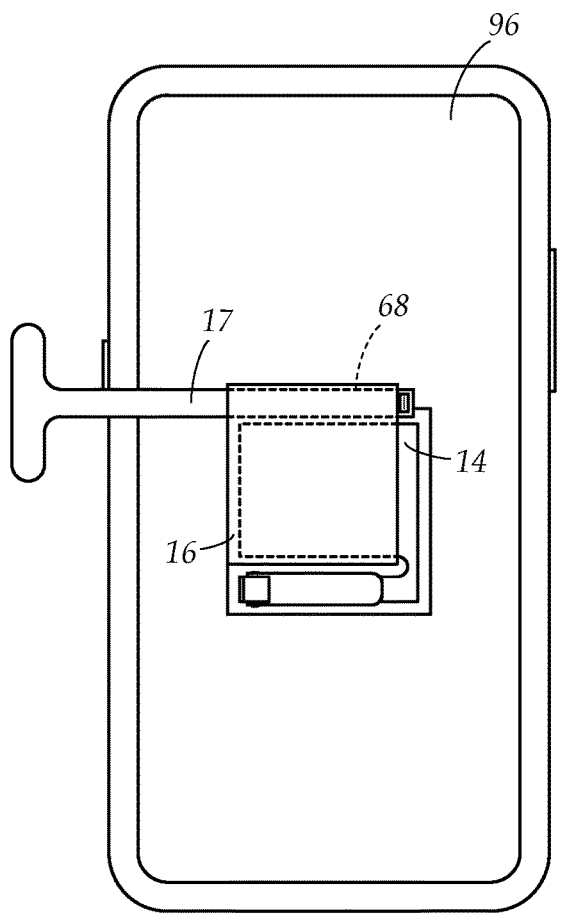
FIG. 6A is a rear elevation view of the rotating sliding handle apparatus attached to the back of a mobile phone, illustrating the grab bar slid out from the rotating plate past the side edge of the mobile phone according to one embodiment of the present disclosure.
Figure 6B:
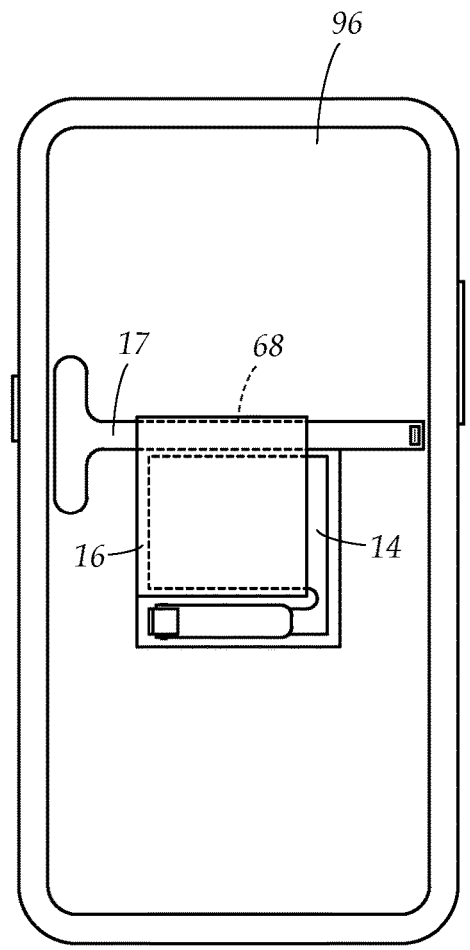
FIG. 6B is a rear elevation view of the rotating sliding handle apparatus attached to the back of a mobile phone, illustrating the grab bar retracted into the rotating plate of the mobile phone such that the grab bar is circumscribed by the edges of the mobile phone according to one embodiment of the present disclosure.

Referring now to FIGS. 6A-6B, the grab bar 17 is slidably disposed within the channel 68 of the slide member 16 and is retractably extendable from the slide member 16 in a horizontal direction to enable the grab bar 17 to slide orthogonally outwardly relative to the central vertical axis of the rotating plate 14. The grab bar 17 is slidable about the channel 68 between a retracted configuration and an extended configuration. In the retracted configuration, the grab bar 17 does not jut out from any sides of the mobile phone 96 and is hidden in front elevation view of the mobile phone 96. In the extended configuration, the grab bar 17 juts out from a side of the mobile phone 96 and can be seen in a front elevation view of the mobile phone 96.

Figure 6C:
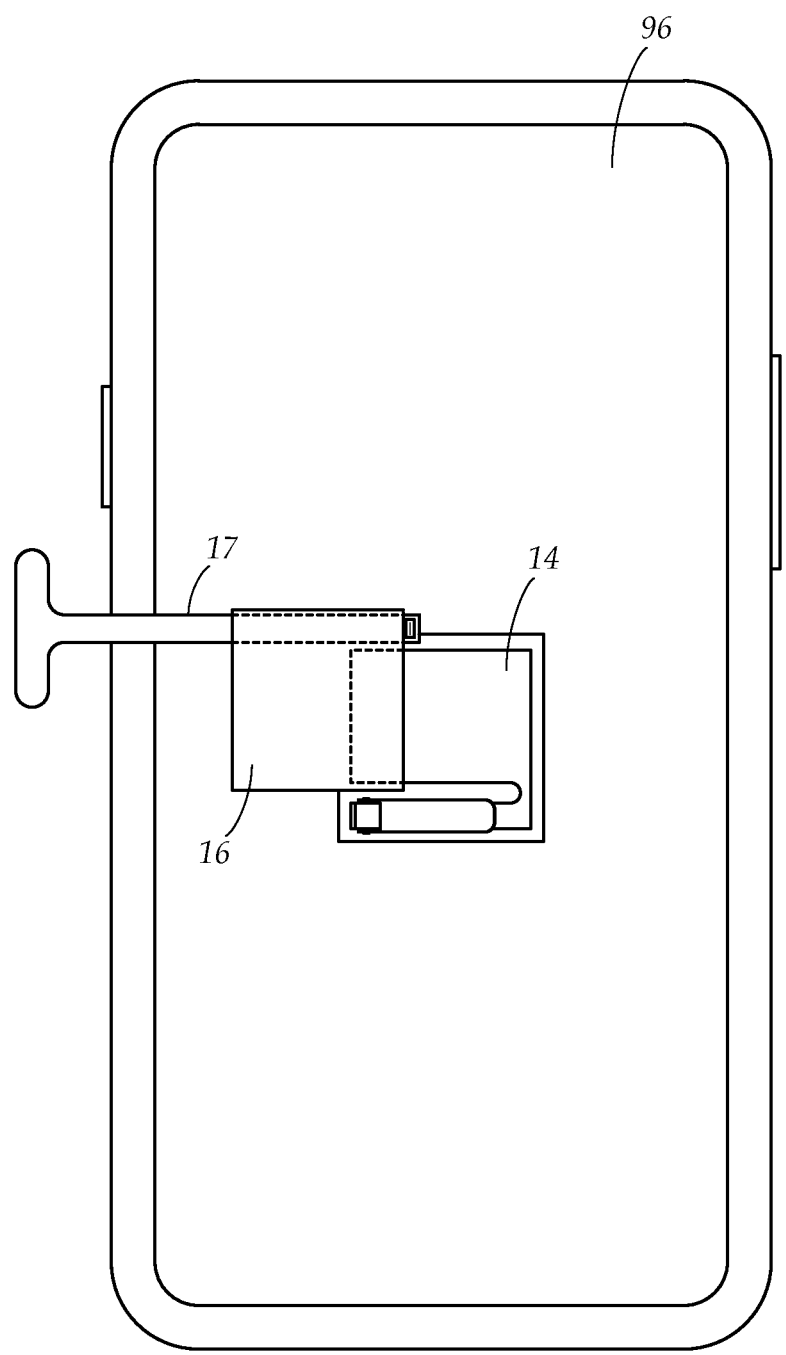
FIG. 6C is a rear elevation view of the rotating sliding handle apparatus attached to the back of a mobile phone, illustrating the grab bar slid out from the rotating plate past the side edge of the mobile phone and the rotating plate slid out from the base to extend the reach of the grab bar according to one embodiment of the present disclosure.
Figure 7A:
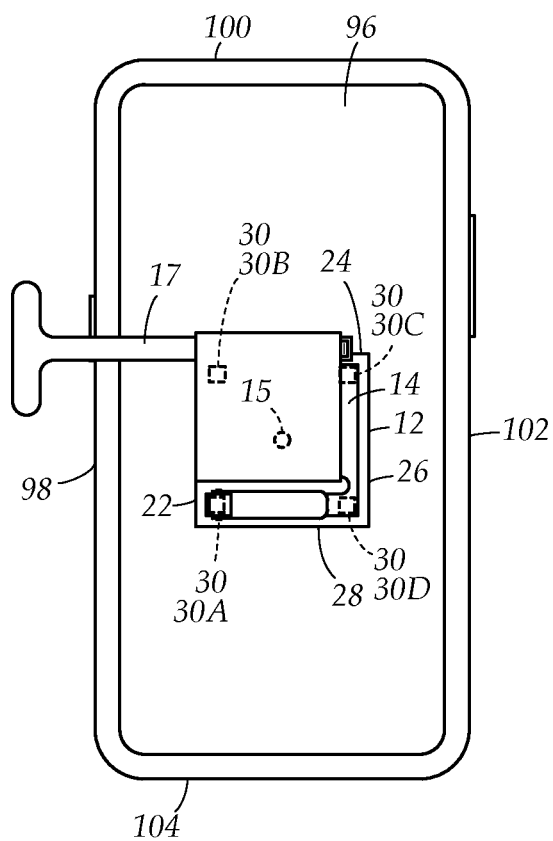
FIG. 7A is a rear elevation view of the rotating sliding handle apparatus attached to the back of a mobile phone, illustrating one configuration in which the rotating plate may be rotatably positioned relative to the mobile phone to enable positioning of the grab bar on a second side of the mobile phone according to one embodiment of the present disclosure.
Figure 7B:
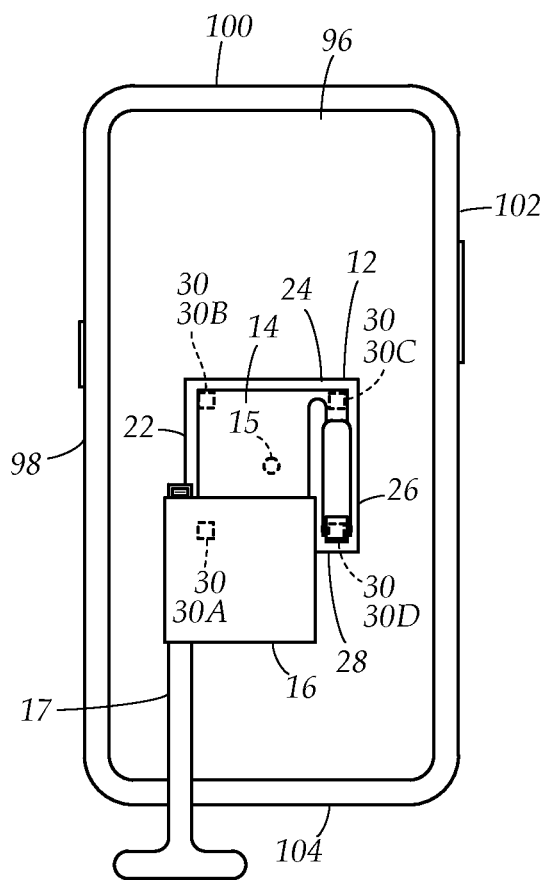
FIG. 7B is a rear elevation view of the rotating sliding handle apparatus attached to the back of a mobile phone, illustrating another configuration in which the rotating plate may be rotatably positioned relative to the mobile phone to enable positioning of the grab bar on a second side of the mobile phone and the rotating plate slid out from the base to extend the reach of the grab bar according to one embodiment of the present disclosure.
Figure 7C:
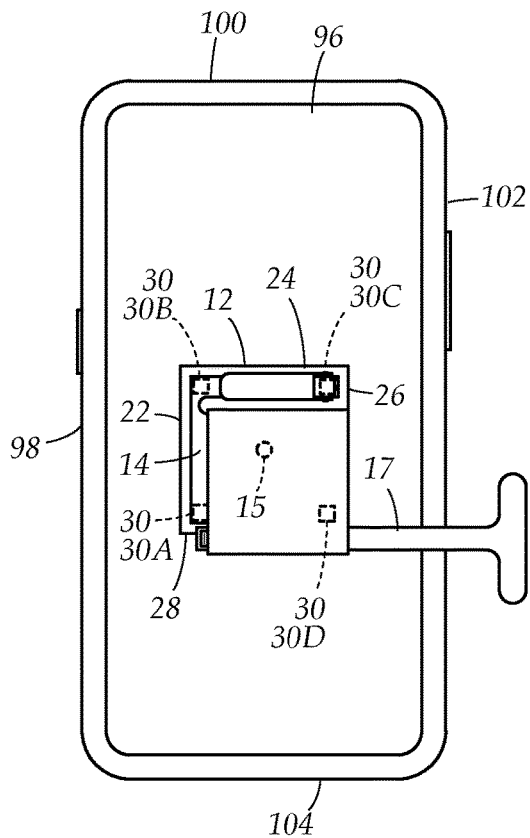
FIG. 7C is a rear elevation view of the rotating sliding handle apparatus attached to the back of a mobile phone, illustrating another configuration in which the rotating plate may be rotatably positioned relative to the mobile phone to enable positioning of the grab bar on a third side of the mobile phone according to one embodiment of the present disclosure.
Figure 7D:
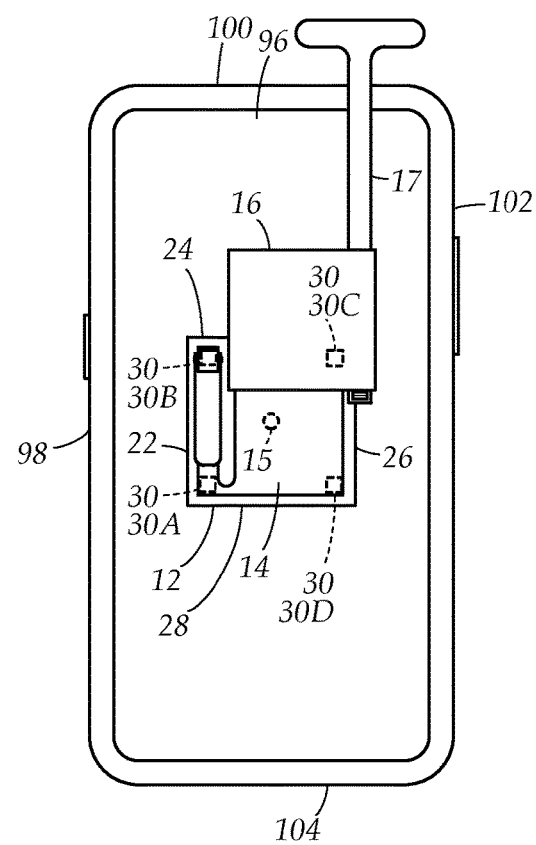
FIG. 7D is a rear elevation view of the rotating sliding handle apparatus attached to the back of a mobile phone, illustrating another configuration in which the rotating plate may be rotatably positioned relative to the mobile phone to enable positioning of the grab bar on a fourth side of the mobile phone and the rotating plate slid out from the base to extend the reach of the grab bar according to one embodiment of the present disclosure.

Referring now to FIGS. 6C, 7B, and 7D, the slide member 16 is retractably extendable from the rotating plate 14 in a horizontal direction to enable the slide member 16 to slide orthogonally outwardly relative to the central vertical axis of the rotating plate 14. This enables a user to extend the reach of the grab bar 17 when the area of the back of the mobile phone 96 is larger or when positioning the grab bar 17 to enable a user to hold the mobile phone 96 in a landscape orientation.

Referring now to FIGS. 7A-7D, the rotating plate 14 is rotatable about the base 12 via the pivot 15. The rotating plate 14 is rotatable about the pivot 15 in a horizontally axial direction relative to the central vertical axis of the rotating plate 14. The first side 22 of the base 12 includes at least a first lock hole 30A of the plurality of lock holes 30. The second side 24 of the base 12 includes at least a second lock hole 30B of the plurality of lock holes 30. The third side 26 of the base 12 includes at least a third lock hole 30C of the plurality of lock holes 30. The fourth side 28 of the base 12 includes at least a fourth lock hole 30D of the plurality of lock holes 30.

In the unlocked position, the rotating plate 14 is rotatable about the base 12 such that the flange 60 (see FIGS. 5A, 5B, and 8) may be positioned above each of the plurality of lock holes 30. When the flange 60 is engaged with the first lock hole 30A, as shown in FIG. 7A, the rotating plate 14 orients the grab bar 17 toward a first direction which enables the grab bar 17 to slide outwardly past a first side 98 of the mobile phone 96. When the flange 60 is engaged with the second lock hole 30B, as shown in FIG. 7D, the rotating plate 14 orients the grab bar 17 toward a second direction which enables the grab bar 17 to slide outwardly past a second side 100 of the mobile phone 96. When the flange 60 is engaged with the third lock hole 30C, as shown in FIG. 7C, the rotating plate 14 orients the grab bar 17 toward a third direction which enables the grab bar 17 to slide outwardly past a third side 102 of the mobile phone 96. When the flange 60 is engaged with the fourth lock hole 30D, as shown in FIG. 7B, the rotating plate 14 orients the grab bar 17 toward a fourth direction which enables the grab bar 17 to slide outwardly past a fourth side 104 of the mobile phone 96. This enables a user to lock the rotating plate 14 on the back of the mobile phone 96 to adjustably position the grab bar 17 in a particular direction that enables the user to hold the mobile phone 96 in a landscape or portrait orientation.

Figure 1:
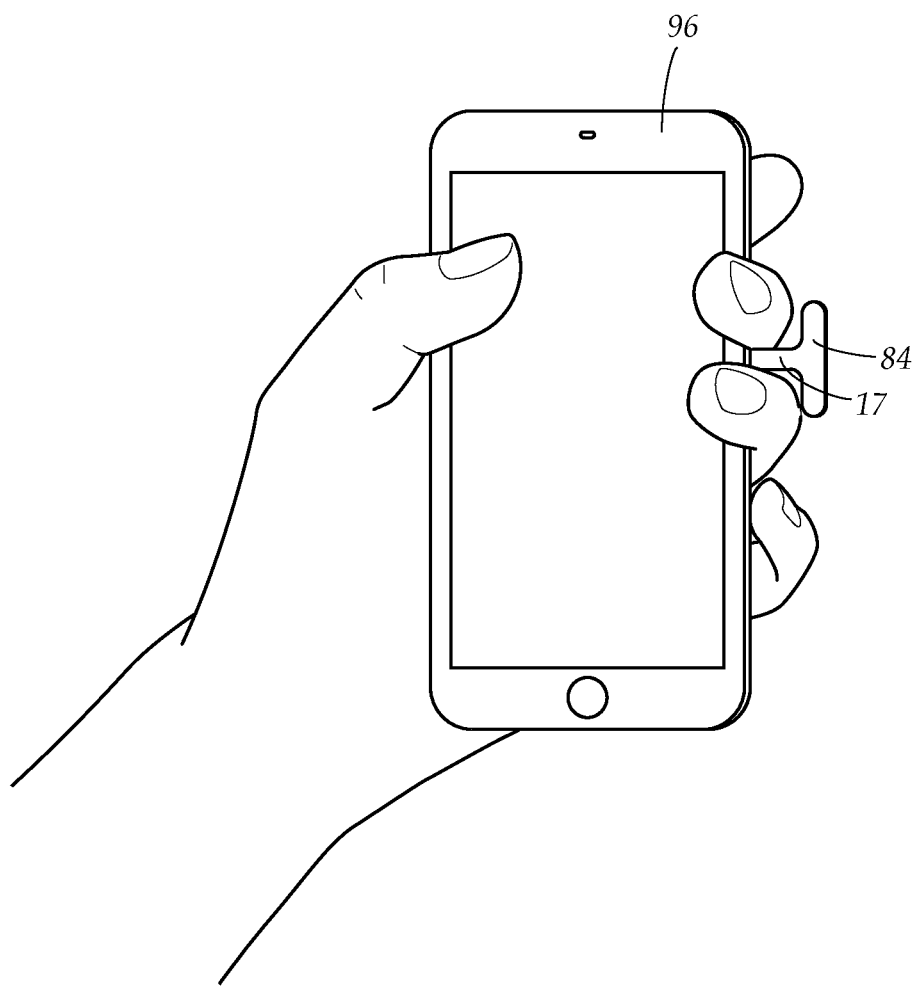
FIG. 1 is a front elevation view of the rotating side sliding handle apparatus in use, illustrating one manner in which the grab bar juts out from a side of a mobile phone according to one embodiment of the present disclosure.
Figure 2:
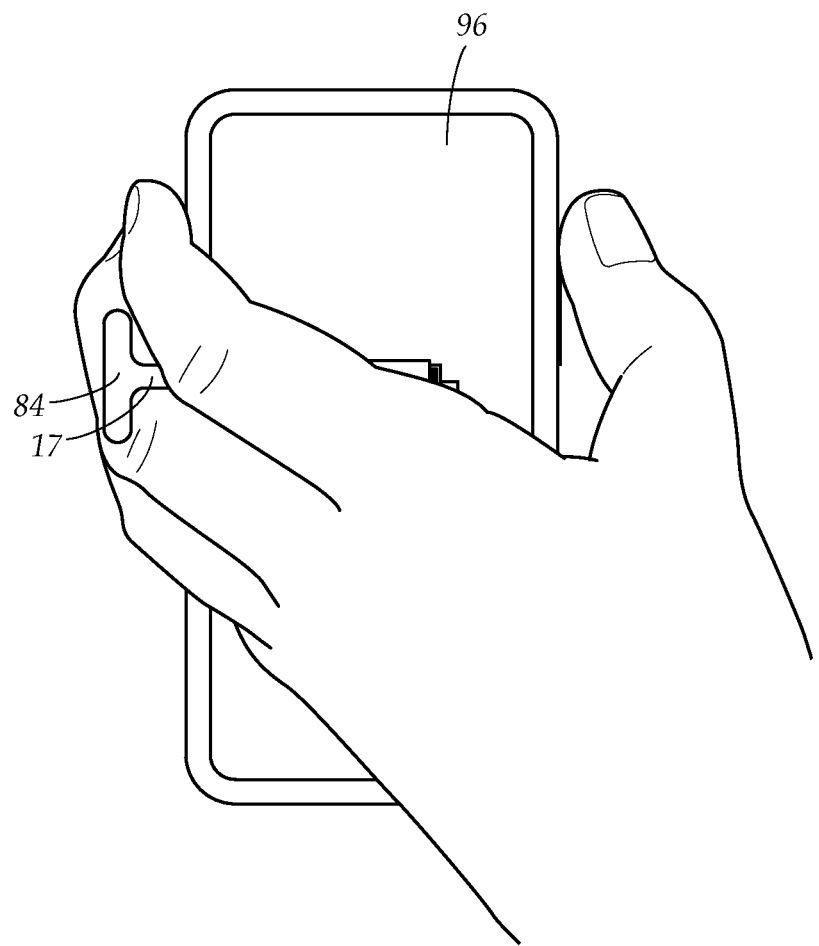
FIG. 2 is a rear elevation view of the rotating side sliding handle apparatus in use, illustrating one manner in which the grab bar juts out from a side of a mobile phone according to one embodiment of the present disclosure.

Referring now to FIGS. 1 and 2, when deployed, the grab bar 17, particularly the finger grip 84, juts out from a side of the mobile phone 96. By jutting out from the side of the mobile phone 96, the grab bar 17 provides multiple ways in which a user may leverage the finger grip 84 to more stably hold the mobile phone 96. For example, in one operation of the rotating side sliding handle apparatus, users may grasp the mobile phone 96 from the back and thread their fingers through the finger grip 84 to grasp the mobile phone 96. The t-shaped member of the finger grip 84 catches the back of the users' fingers serving as a catch to prevent the mobile phone 96 from falling from the users' grasp.

In another operation of the rotating side sliding handle apparatus, users may thread their fingers through the finger grip 84 from the front of the mobile phone 96 to leverage the finger grip 84 against the back of their fingers to hold the mobile phone 96 without having to clutch it. In this way, users do not have to fully wrap their hands around the back of the mobile phone 96 in order to grasp it, but rather simply have to grab the side edges of the mobile phone 96, thereby providing them more reach across the display screen of the mobile phone 96.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a rotating side sliding handle apparatus for a mobile phone. The disclosure is illustrated by example in the drawing figures, and throughout the written description. It should be understood that numerous variations are possible, while adhering to the inventive concept. Such variations are contemplated as being a part of the present disclosure.

What is claimed is:

1. A rotating side sliding handle apparatus for attachment to the back of an electronic device, comprising:
   a base including an adhesive removably attached to the back of the electronic device;
   a rotating plate pivotally connected to the base, the rotating plate including a central vertical axis, the rotating plate coaxial with the base and rotatable horizontally axially about the central vertical axis of the rotating plate, the rotating plate releasably engageable with the base into a locked position and an unlocked position;
   a slide member slidably disposed on the rotating plate, the slide member retractably extendable from the rotating plate horizontally to slide orthogonally outwardly relative to the central vertical axis of the rotating plate; and
   a grab bar slidably disposed in the slide member, the grab bar including a first end and a second end, the first end opposite the second end, the first end including a finger grip, the grab bar retractably extendable from the slide member horizontally to slide orthogonally outwardly relative to the central vertical axis of the rotating plate;
   wherein in the locked position the rotating plate is fixed to the base in a static position and in the unlocked position the rotating plate is free to rotate horizontally axially about the base.

2. The apparatus of claim 1, wherein:
the base comprises a plurality of lock holes; and
the rotating plate comprises an arm including a flange releasably engageable with the plurality of lock holes of the base to secure the rotating plate in the locked position.

3. The apparatus of claim 2, wherein the rotating plate further comprises a stand coupled to the arm, the stand configured to release the flange from a lock hole of the plurality of lock holes to release the rotating plate into the unlocked position.

4. The apparatus of claim 3, wherein the slide member comprises a first end, a second end, the first end opposite the second end, a first side, a second side, the first side opposite the second side, a channel extending between the first end and the second end, and a track extending between the first end and the second end, the channel including the grab bar positioned therethrough, the track configured to slidably receive the rotating plate.

5. The apparatus of claim 4, wherein:
the grab bar is slidably disposed in the channel, the grab bar comprising a first surface and a second surface, the first surface opposite the second surface; and
the second end of the grab bar includes a projection protruding upwardly from the first surface, the projection preventing the second end of the grab bar from entering the channel, thereby securing the grab bar within the channel.

6. The apparatus of claim 5, wherein the finger grip comprises a t-shaped member coplanar with the grab bar, the t-shaped member protruding outwardly from the first end and including a width larger than a width of the channel to prevent the finger grip from entering the channel, thereby securing the grab bar within the channel.

7. The apparatus of claim 6, wherein the rotating plate further comprises a body and a cutout portion, the body coplanar with the arm, the cutout portion defining a space between the body and the arm, the body including a first side and a second side, the first side opposite the second side, the first side including a first groove, the second side including a second groove.

8. The apparatus of claim 7, wherein:
the track of the slide member includes a first rail, a second rail, the first rail opposite the second rail, and a space between the first rail and the second rail, the first rail slidably engaged with the first groove, the second rail slidably engaged with the second groove, the opening slidably receiving the body of the rotating plate; and
the cutout portion slidably receives the second side of the slide member.

9. The apparatus of claim 8, wherein the arm includes a first end, a second end, the first end opposite the second end, an upper surface, and a lower surface, the upper surface opposite the lower surface, the first end including the flange protruding downwardly outwardly from the lower surface toward the base and away from the rotating plate.

10. The apparatus of claim 9, wherein the stand is pivotally connected to the first end of the arm on the upper surface of the arm, the stand vertically pivotable relative to the rotating plate, the stand including a first end, a second end, the first end opposite the second end, and an arcuate portion extending between the first end and the second end, the first end of the stand pivotally connected to the first end of the arm, the arcuate portion extending downwardly toward the base and including a height larger than a height of the first end of the stand and the second end of the stand, the arcuate portion abutting the base causing the second end of the stand to jut out from the arm.

11. The apparatus of claim 10, wherein the stand defines a lever including a fulcrum, an effort arm, and a resistance arm, wherein the arcuate portion of the stand is the fulcrum, the second end of the stand is the effort arm, and the first end of the stand is the resistance arm, such that a downward force exerted on the second end of the stand exerts an upward force on the first end of the stand over the arcuate portion, which in turn exerts an upward force on the first end of the arm to disengage and release the flange from a lock hole of the plurality of lock holes.

12. The apparatus of claim 11, wherein:
the base includes at least a first side, a second side, a third side, and a fourth side;
the first side includes a first lock hole of the plurality of lock holes, the grab bar oriented toward a first direction when the flange is locked in the first lock hole;
the second side includes a second lock hole of the plurality of lock holes, the grab bar oriented toward a second direction when the flange is locked in the second lock hole;
the third side includes a third lock hole of the plurality of lock holes, the grab bar oriented toward a third direction when the flange is locked in the third lock hole; and
the fourth side includes a fourth lock hole of the plurality of lock holes, the grab bar oriented toward a fourth direction when the flange is locked in the fourth lock hole.

13. The apparatus of claim 12, wherein the rotating plate is pivotable about the base via pivot.

14. The apparatus of claim 13, wherein:
the rotating plate includes a first aperture;
the base includes a second aperture, the second aperture coaxially aligned with the first aperture;
the pivot is threaded through the first aperture and second aperture to connect the rotating plate to the base about the pivot.

15. The apparatus of claim 14, wherein:
the first aperture is disposed centrally in the body of the rotating plate;
the second aperture is disposed centrally on the base;
the pivot comprises a pivot rivet including a cap;
the cap secures the pivot rivet within the first aperture and second aperture to pivotally connect the rotating plate to the base about the pivot.

16. The apparatus of claim 15, wherein the base comprises a planar plate.

* * * * *